United States Patent Office 2,769,770
Patented Nov. 6, 1956

2,769,770

REMOVING ARSENIC FROM A NAPHTHA, WHICH IS REFORMED WITH A NOBLE METAL CATALYST COMPOSITE

Edward J. Bicek, La Grange, Ill., assignor to Universal Oil Products Company, Chicago, Ill., a corporation of Delaware No Drawing. Application June 14, 1952, Serial No. 293,647

10 Claims. (Cl. 196—50)

This invention relates to a catalytic conversion process and more particularly to a conversion process effected in the presence of a catalyst comprising alumina and a noble metal.

Recent developments in the field of reforming of gasoline in order to improve the antiknock characteristics of the gasoline and to the production of aromatic hydrocarbons are directed to the use of a catalyst comprising alumina and platinum. For the hydrocarbon conversion reactions it appears that alumina offers particular advantages in combination with a noble metal and particularly platinum. The association of alumina and platinum catalyzes the reaction desired in reforming operations to a greater extent than heretofore obtainable, with a minimum of undesired side reactions. The reactions desired in reforming operations include dehydrogenation of naphthenes to aromatics, dehydrocyclization of paraffins to aromatics, isomerization of alkylnaphthenes containing 5 carbon rings to naphthenes containing 6 carbon rings and dehydrogenation to aromatics, isomerization of straight chain or slightly branched chain paraffins to more highly branched chain paraffins, controlled cracking or splitting of carbon to carbon bonds, desulfurization, etc. In the dehydrogenation operations to produce aromatics, the desired reactions include the dehydrogenation, dehydrocyclization and naphthene isomerization set forth above.

As hereinbefore set forth, the combination of alumina and a noble metal and particularly platinum is especially active for effecting the desired reactions with a minimum of undesired side reactions. This catalyst appears peculiarly effective in the treatment of charge stocks comprising hydrocarbons and thus offers particular advantages for use in the conversion of hydrocarbons.

In the conversion of hydrocarbons, it now has been found that certain hydrocarbon charging stocks contain certain impurities which rapidly deactivate the alumina-platinum catalyst and render the same inactive for catalyzing the desired reactions as hereinbefore set forth. These impurities are present in hydrocarbon charge stocks in very minute quantities and, therefore, would not be expected to exert any substantial deactivating effect on the catalyst. Surprisingly, certain of these impurities, even in the very minute concentrations as are present in the hydrocarbon charge stocks, do rapidly deactivate the alumina-platinum catalyst and, therefore, render the process inoperable for the intended purpose. In accordance with the present invention, the charge stock is treated in order to remove the harmful impurities or to reduce the content thereof to a concentration at which the deleterious effects are substantially minimized.

In one embodiment the present invention relates to a conversion process effected in the presence of a catalyst comprising alumina and a noble metal, which comprises exposing an impurity-containing charge to light having a wave length of from about 0.1 to about 0.8 microns, separating therefrom a charge fraction having an impurity content of less than about 0.05 parts per million and less than that of said charge, and subjecting said charge fraction to conversion in the presence of a catalyst comprising alumina and a noble metal.

In another embodiment the present invention relates to a hydrocarbon conversion process which comprises treating an arsenic-containing hydrocarbon charge with ultra-violet light, separating therefrom a charge fraction having an arsenic content of less than about 0.05 parts per million and less than that of said charge, and subjecting said hydrocarbon fraction to conversion in the presence of a catalyst comprising alumina and platinum.

In a specific embodiment the present invention relates to a process for producing reformed gasoline from an arsenic-containing hydrocarbon charge, which comprises treating the charge with ultra-violet light, separating therefrom a gasoline fraction having an arsenic content of less than about 0.015 parts per million and less than that of said charge, and reforming said gasoline fraction in the presence of a catalyst comprising alumina, platinum and combined halogen.

As will be noted from the embodiments, an arsenic-containing hydrocarbon charge is treated to lower the arsenic content to less than about 0.05 parts per million. Preferably the arsenic content is reduced to below about 0.015 parts per million. As hereinbefore set forth and as will be shown in the following examples, the presence of arsenic in concentrations of greater than even the minute quantities of 0.05 parts per million rapidly deactivates the aluminum-platinum catalyst. While it is believed that arsenic is the most harmful impurity, other undesirable impurities having a deleterious effect on the catalyst include molybdenum, antimony, nickel, cadmium and lead. It is understood that these impurities may be present as the element or probably as one or more compounds thereof, and that reference to the element in the present specification and claims is intended to include the free element and/or compounds thereof. This method of referring to the element is justified because it appears that the element is the harmful component and that, when present as a specific compound, the compound may decompose and other compounds of the element formed during the conversion reaction. For example, it is believed that arsenic deactivates the catalyst by forming a platinum arsenide or other compound of platinum and arsenic. Although arsenic is considered as a non-metal by some authorities, it resembles the metals in a number of respects and, in view of the fact that the other impurities hereinbefore set forth are metals, it is understood that reference to metallic impurities or similar phraseology is intended to include arsenic along with the other impurities as set forth above, and that removal of these metallic impurities below 0.05 parts per million means that the treated charge does not contain any one of these impurities in a concentration above 0.05 parts per million although the sum total of the impurities may be above 0.05 parts per million.

As hereinbefore set forth, the novel features of the present invention are directed to catalysts comprising alumina and a noble metal. Platinum is a preferred noble metal for use in accordance with the present invention. Other noble metals include palladium, silver, gold, ruthenium, rhodium, osmium, iridium, etc., with the understanding that these catalysts are not necessarily equivalent. The platinum preferably is utilized in the catalyst in a concentration of from about 0.01% to about 1% by weight of the final catalyst, although it is understood that lower or higher concentrations of platinum, which generally will not be above about 10%, may be employed.

As hereinbefore set forth, the catalyst contains alumina. In one embodiment the alumina comprises a major proportion of the catalyst and may comprise, for example, over 95% by weight of the catalyst. In another embodiment, the catalyst may include alumina as well as other inorganic oxides as, for example, oxides of silicon, magnesium, zirconium, thorium, vanadium, titanium, boron, etc., or mixtures thereof, and the alumina moreover may comprise a minor proportion of the catalyst. For example, one catalyst may comprise silica-alumina-platinum and, in one embodiment, the silica may comprise from about 70% to about 95% and the alumina may comprise from about 5% to about 30% by weight of the mixture.

It is understood that the alumina and other inorganic oxides are porous and reference to alumina in the present specification and claims is intended to refer to porous alumina, including gamma-alumina, and not to include non-porous aluminas as a component of the catalyst in a substantial amount.

In a preferred embodiment the alumina-platinum catalyst also contains a halogen. The halogen may be in a concentration of from about 0.01% to about 8% by weight of the final catalyst, although higher or lower concentrations may be employed. The halogen is believed to be present in combined form, and the halogen preferably comprises combined fluorine which advantageously is present in a concentration of from about 0.01% to about 3% by weight of the catalyst. The combined chlorine generally is present in a concentration of from about 0.1% to about 8% by weight of the catalyst. The combined bromine and combined iodine generally are not as preferable but may be employed, when desired, in a concentration of from about 0.01% to about 8% by weight of the catalyst. It is understood that the various halogens which may be employed are not necessarily equivalent and also that the combined halogen content of the catalyst may comprise a mixture of two or more of the halogens, in which case the total halogen concentration preferably comprises from about 0.01% to about 8% by weight of the catalyst.

In accordance with the present invention charge stocks containing arsenic are subjected to irradiation with light having a wave length of from about 0.1 to about 0.8 microns. In a preferred embodiment the light employed is ultra-violet light having a wave length of from about 0.1 to about 0.4 microns. Visible light having a wave length of from about 0.4 to about 0.8 microns may be used but not necessarily with equivalent results. Any suitable source of light rays may be employed in accordance with the present invention, including light from a mercury electrode arc lamp, a carbon electrode arc lamp, a filament type of lamp, tungsten lamp, fluorescent lamp, sun-rays, etc.

The particular source of light to be used in any given instance will depend upon the specific light rays desired and the specific method of exposing the hydrocarbon charge to the light rays. In one method, a suitable source of radiation may be disposed within a confined zone, which may comprise, for example, a pipeline or a reaction zone, and the hydrocarbon charge is thusly exposed to the light rays. In this method, a tubular mercury or gas lamp which gives short wave length radiation may be mounted concentrically inside of a pipe carrying the hydrocarbon charge to be irradiated. Insulated leads are carried out through the pipe or one lead may be used and the other contact grounded on the pipe. In another embodiment, such a light source may be disposed within a reaction zone. In another embodiment the hydrocarbon charge may be contained in one or more vessels transparent to ultraviolet light such as, for example, quartz vessels, or the vessels may be quartz windows for the transmission of ultraviolet light. In still another embodiment, particularly applicable when the source of light comprises sun rays, the hydrocarbon charge may be passed slowly through a baffled shallow chamber which is exposed to the rays of the sun, the chamber preferably having a cover made of transparent material such as quartz. It is understood that any suitable method for effecting the desired irradiation of the hydrocarbon charge may be employed within the scope of the present invention.

The time of irradiation of the hydrocarbon charge with light will vary with the particular type of arsenic compounds contained in the hydrocarbon charge being treated. It has been found that arsenic in different forms is present in different hydrocarbon charges and, therefore, the more reactable arsenic compounds will require less irradiation than the less reactable arsenic compounds. In general the time of irradiation may vary from 15 minutes to 10 hours or more. However, when the hydrocarbon charge is permitted to remain in storage and/or an oxidizing catalyst or reagent is added to the hydrocarbon charge before, during or after irradiation, the time of actual irradiation by light may be decreased to as low as about one second, although in general the irradiation preferably ranges from two seconds to five minutes in this embodiment of the invention. Usually the irradiation will be effected at ambient temperature, although it is understood that elevated temperatures may be employed, which elevated temperature in general will not exceed about 700° F., preferably at sufficient pressure to maintain the hydrocarbons in substantially liquid phase, although in some cases vapor phase may be employed.

In another embodiment the irradiation with ultraviolet light is applied to a hydrocarbon feed stock which is treated either before, during, or subsequent to the irradiation with an oil soluble metal salt of an organic acid, such as copper, cobalt or manganese naphthenates, oleates and/or stearates, or with other metal compounds which accelerate the peroxidation of hydrocarbons as, for example, the cobalt chelate of disalicylalpropylene diamine. The concentration at which the various compounds are most effective varies but in general the concentrations considered in this embodiment are in the range of from about 0.01 to about 1000 parts of metal salt per one million parts of hydrocarbon.

Although not with the intention of unduly limiting the present invention, applicant offers the explanation that irradiation with light in the manner hereinbefore set forth serves to convert the arsenic or compounds thereof, as contained in the hydrocarbon charge, into a form which is more readily removed in a subsequent separation step. Thus, the charge after irradiation may be subjected to any suitable treatment in order to remove the arsenic compounds. Particularly preferred separation treatments include water washing, passage through a solid adsorbent including clay, synthetic silica aluminates, silica magnesia, silica zirconia, etc., or mixtures thereof, extraction with a base and/or acid including ammonium hydroxide, sodium hypochlorite, sodium hypobromite, sulfuric acid, hydrochloric acid, etc. These treatments may be effected at any suitable temperature. In one embodiment the temperature may range from atmospheric to about 200° F. In another embodiment higher temperatures may be employed which generally will not be above about 700° F. A particularly preferred embodiment comprises passing the irradiated hydrocarbon charge through a bed of clay followed by water washing, or the reverse procedure, or both of these treatments, these treatments preferably being effected at a temperature of from atmospheric to about 200° F.

In still another embodiment, the hydrocarbon charge after irradiation may be allowed to stand in storage for a period of from about one to 10 days or more and then subjected to the extraction treatments hereinbefore set forth. With certain type of arsenic compounds as contained in certain hydrocarbon charges, it is believed that the irradiation treatment may require a longer reaction time and, after being subjected to the irradiation, the hydrocarbon charge may continue to undergo reaction while standing in storage. This conventional storage is in a confined zone and in the absence of light rays. However, the irradiation treatment continues from within and will serve to effect the desired treatment of the hydrocarbon charge.

In still another embodiment, the irradiation treatment may be preceded by some other form of treatment, including treatment of the charge stock with air or other suitable oxygen-containing gas, water washing, passage through a solid adsorbent, treatment with acid, base, etc., or a mixture of these treatments. As hereinbefore set forth, the arsenic in certain hydrocarbon charges is in a form difficult to remove and the multiple treatment is necessary in order to successfully remove the arsenic from certain hydrocarbon charging stocks in order that the charge stock satisfactorily may be subjected to reforming with the alumina-platinum catalyst.

As hereinbefore set forth, the novel features of the present invention are particularly applicable to the treatment of a gasoline fraction to be subjected to reforming. It is understood that the gasoline fraction may comprise a full boiling range gasoline having an end boiling point of from about 400° to about 430° F., or any selected fraction thereof and that it may include components boiling above the gasoline range, thus having an end boiling point up to 500° F. or more. The hydrocarbon fraction preferably comprises a substantially saturated hydrocarbon distillate, including straight run gasoline, natural gasoline, etc., or mixtures thereof. In some cases it may comprise an unsaturated distillate, including cracked gasoline, as well as mixtures of the unsaturated gasoline and saturated gasoline. The reforming operation is effected at a temperature of from about 600° to about 1000° F. or more, a pressure of from about atmospheric to 1000 pounds per square inch or more, and a weight hourly space velocity from about 0.1 to 10 or more. The weight hourly space velocity is defined as the weight of oil per hour per weight of catalyst in the reaction zone. In one embodiment, the reforming is effected in the presence of hydrogen and, in this embodiment, the hydrogen produced in the process preferably is recycled for further use therein. The concentration of hydrogen to hydrocarbon in the reaction zone generally will be in a molar ratio of from about 0.1:1 to about 10:1 or more. When the hydrogen gas to be recycled contains hydrogen sulfide or other impurities, it is within the scope of the invention to treat the recycle gas to remove the impurities before reusing the gas in the process.

In another preferred embodiment, the novel features of the present invention are particularly applicable to the conversion of naphthenes into aromatics as hereinbefore set forth. Generally the charge in this embodiment will comprise a selected hydrocarbon distillate which, in one embodiment, may have a boiling range of from about 140° to about 280° F. The conditions of operation used in this embodiment are substantially the same as those hereinbefore set forth except that the temperature to be employed preferably is within the range of from about 800° to 1000° F. or more.

While the process of the present invention is particularly applicable to the reforming or aromatization reactions hereinbefore set forth, it is understood that the novel features may be employed in any process in which a catalyst comprising alumina and a noble metal and particularly platinum is used. Representative processes include dehydrogenation of normally gaseous aliphatic hydrocarbons, such as ethane, propane, butane, to the corresponding olefins, etc., dehydrogenation of mono-olefins to di-olefins, destructive hydrogenation or hydrocracking reactions in which a hydrocarbon and particularly oil heavier than gasoline is subjected to conversion to produce lower boiling products and particularly gasoline, non-destructive hydrogenation reactions, including hydrogenation of unsaturated aliphatic compounds, such as mono-olefins, di-olefins, etc. to form the corresponding saturated hydrocarbons, hydrogenation of unsaturated cyclic hydrocarbons, hydrogenation of unsaturated alcohols, ketones, acids, etc., oxidation of olefins to form the corresponding oxides, such as the oxidation of ethylene to ethylene oxide, propylene to propylene oxide, etc., oxidation of alcohols, ketones, etc. The conditions of operation to be employed will depend upon the particular reaction to be effected. Thus, for non-destructive hydrogenation reactions, the temperature may range from atmospheric to 500° F. or more, the pressure from about 10 to about 2000 pounds or more, and the weight hourly space velocity of from about 0.1 to 10 or more.

The conversion reactions mentioned above may be effected in any suitable manner. The reforming process thus may be effected in the fixed bed, slurry type, moving bed or fluidized type process.

The following examples are introduced to illustrate further the novelty and utility of the present invention but not with the intention of unduly limiting the same.

Example I

To a catalyst comprising alumina, about 0.3% by weight of platinum and about 0.2% by weight of combined fluorine, arsenic was added in a concentration of 0.0025 gram atoms per 50 grams of catalyst. The arsenic was added as arsenic pentoxide in ammoniacal solution by dissolving the required amount in 50 ml. of water and pouring over 50 grams of the catalyst. The catalyst was allowed to stand for one-half hour, then was dried on a water bath and finally calcined for 3 hours in a muffle furnace at 932° F.

The catalysts in this example were utilized for the aromatization of a Mid-Continent naphtha having an A. P. I. gravity at 60° F. of 52.7, an aromatic content of 8.8% and a boiling range of 229° to 387° F. The aromatization was effected at a temperature of 977° F., a superatmospheric pressure of 300 pounds per square inch and a hydrogen to hydrocarbon molar ratio of 1.75:1.

Catalyst A comprised the alumina-platinum-halogen composite as described above but not containing the arsenic. Catalyst B comprised the catalyst containing the arsenic as described above.

In the aromatization runs, catalyst A produced an average of 48.3% by weight of aromatics. In contrast, catalyst B under the same conditions produced only 23.6% by weight of aromatics. It thus will be noted that the arsenic reduced the aromatization activity of the catalyst to less than half of the catalyst not containing arsenic.

Example II

Other catalysts were prepared in a similar manner as described in Example I but contained 0.0025 gram atoms of molybdenum, antimony, nickel, cadmium, and lead. These catalysts when utilized under the same conditions as described in Example I produced the following yields of aromatics:

TABLE

| Added component: | Percent aromatics |
|---|---|
| None | 48.3 |
| Molybdenum | 24.5 |
| Antimony | 30.0 |
| Nickel | 30.2 |
| Cadmium | 30.7 |
| Lead | 33.5 |

Here again it will be noted that catalysts containing as low as 0.0025 gram atoms per 50 grams of catalyst of the various impurities considerably reduced the aromatization activity of the catalysts.

Example III

In a commercial reforming process utilizing a catalyst as described in Example I and charging approximately 1200 barrels per day of a Mid-Continent naphtha, the activity of the catalyst decreased rapidly. The naphtha had an A. P. I. gravity of about 53.0, a boiling range of from 210° to 428° F. and contained approximately 6.8% by weight of aromatics. It was found that the naphtha being charged to this unit contained approximately 0.16 parts per million of arsenic.

As hereinbefore set forth, one of the desired reactions in reforming operations is dehydrogenation of the naphthenes to aromatics. This dehydrogenation is highly endothermic and, therefore, results in a comparatively large temperature differential between the inlet and outlet of a reaction zone maintained under adiabatic conditions. This temperature differential is indicative of the dehydrogenation activity of the catalyst. In this process, the naphtha was introduced into the reaction zone at a temperature of approximately 900° F. and in normal operations a temperature drop of above about 50 degrees indicates that satisfactory dehydrogenation is obtained. However, because of the arsenic content of the naphtha, the temperature differential between the inlet and outlet of the reaction zone on the first day was 53° F. but after 11 days of operation it dropped to 17° F. It readily is apparent that this small temperature differential indicates substantial loss in the dehydrogenation activity of the catalyst.

As measured in octane number, the operation in which the temperature differential between the inlet and outlet of the reaction zone was above about 50° F. resulted in a reformate having an F-1+3 cc. of tetraethyl lead octane number of 92. In contrast, under the same conditions of operation but utilizing the catalyst deactivated by arsenic-containing impurities, in which the temperature differential between the inlet and outlet of the reaction zone was only 17° F., the F-1+3 cc. of tetraethyl lead octane number was only 72.4. The F-1+3 cc. of lead octane number of the charge fraction was 66.5. Thus it is seen that the temperature differential in the reaction zone is a measure of the activity of the catalyst.

*Example IV*

A West Virginia naphtha having approximately 0.8 parts per million of arsenic was subjected to irradiation. 500 ml. of the naphtha were subjected to irradiation in a 1 liter flask for two hours by a General Electric reflector type sun lamp (Type RS) positioned at a distance of approximately two feet from the flask. The irradiated naphtha was washed with water at room temperature and then filtered. This treatment served to reduce the arsenic content of the naphtha to substantially zero.

I claim as my invention:

1. The method of converting an arsenic-containing hydrocarbon charge which comprises irradiating the charge with ultra-violet light, separating therefrom a charge fraction having an arsenic content of less than about 0.05 parts per million and less than that of said charge, and subjecting said charge fraction to conversion in the presence of a catalyst comprising alumina and a noble metal.

2. The process of producing reformed gasoline from an arsenic-containing hydrocarbon charge which comprises irradiating the charge with light having a wave length of from about 0.1 to about 0.8 microns, separating therefrom a gasoline fraction having an arsenic content of less than about 0.015 part per million and less than that of said charge, and reforming said gasoline in the presence of a catalyst comprising alumina and platinum.

3. The method of producing reformed gasoline from an arsenic-containing hydrocarbon charge which comprises irradiating the charge with light having a wave length of from about 0.1 to about 0.8 microns, subjecting the irradiated hydrocarbon charge to water washing, separating therefrom a gasoline fraction having an arsenic content of less than about 0.015 parts per million and less than that of said charge, and reforming said gasoline in the presence of a catalyst comprising alumina and platinum.

4. The method of producing reformed gasoline from an arsenic-containing hydrocarbon charge which comprises irradiating the charge with light having a wave length of from about 0.1 to about 0.8 microns, passing the irradiated charge through a bed of solid adsorbent and thereby separating a gasoline fraction having an arsenic content of less than about 0.015 parts per million and less than that of said charge, and reforming said gasoline in the presence of a catalyst comprising alumina and platinum.

5. The method of producing reformed gasoline from an arsenic-containing hydrocarbon charge which comprises irradiating the charge with light having a wave length of from about 0.1 to about 0.8 microns, passing the irradiated charge through a bed of clay at a temperature below 200° F. and thereby separating a gasoline fraction having an arsenic content of less than about 0.015 parts per million and less than that of said charge, and reforming said gasoline in the presence of a catalyst comprising alumina and platinum.

6. The process of producing a reformed gasoline from an arsenic-containing hydrocarbon charge which comprises irradiating the charge with ultra-violet light, water washing the irradiated charge to separate therefrom a gasoline fraction having an arsenic content of less than about 0.015 parts per million and less than that of said charge, and reforming said gasoline in the presence of a catalyst comprising alumina, platinum and combined halogen.

7. The process of producing aromatics from an arsenic-containing hydrocarbon charge which comprises irradiating the charge with light having a wave length of from about 0.1 to about 0.8 microns, separating therefrom a hydrocarbon fraction having an arsenic content of less than about 0.05 parts per million and less than that of said charge and subjecting said hydrocarbon fraction to aromatization in the presence of a catalyst comprising alumina and a noble metal.

8. The process of producing aromatics from a naphthenic hydrocarbon charge containing arsenic which comprises irradiating the charge with ultra-violet light, washing the irradiated charge with water to separate a naphthene fraction having an arsenic content of less than about 0.015 parts per million and less than that of said charge, and subjecting said fraction to dehydrogenation in the presence of a catalyst comprising alumina and platinum.

9. The method of converting an arsenic-containing hydrocarbon charge which comprises irradiating the charge with ultra-violet light, separating therefrom a charge fraction having an arsenic content of less than about 0.05 parts per million and less than that of said charge, and subjecting said charge fraction to conversion in the presence of a catalyst comprising a noble metal and a support therefor.

10. The process of producing reformed gasoline from an arsenic-containing hydrocarbon charge which comprises irradiating the charge with light having a wave length of from about 0.1 to about 0.8 microns, separating therefrom a gasoline fraction having an arsenic content of less than about 0.015 parts per million and less than that of said charge, and reforming said gasoline in the presence of a catalyst comprising platinum and a support therefor.

References Cited in the file of this patent

UNITED STATES PATENTS

| | | |
|---|---|---|
| 1,590,841 | McConnell | June 29, 1926 |
| 2,332,793 | Hermann | Oct. 26, 1943 |
| 2,479,110 | Haensel | Aug. 16, 1949 |

OTHER REFERENCES

Kalichevsky et al.: "Chemical Refining of Petroleum," Chemical Catalog Co., 1933, pages 293–294.

Lewis et al.: Ind. & Eng. Chem., anal. ed., vol. 9, pages 405–406 (1937).

Thomas: "The Science of Petroleum," vol. 11, Oxford University Press, page 1054 (1938).

Berkman: "Catalysis," Reinhold Pub. Co., 1940, pages 393, 395, 402.

Maxted: "Journal of the Society of Chemical Industry," vol. 67, pages 93–97, March 1948.

"Chem. Abstracts," vol. 45, 3698g, May 10, 1951.